United States Patent [19]
Wantuck, Jr. et al.

[11] Patent Number: 6,134,019
[45] Date of Patent: Oct. 17, 2000

[54] HELP BUTTON SERVICE FOR A USER INTERFACE IN A DIGITAL PRINTING SCANNING OR FACSIMILE SYSTEM

[75] Inventors: Stanley E. Wantuck, Jr., Canandaigua; Alan K. Robertson; Gary M. Davis, both of Rochester, all of N.Y.

[73] Assignee: Xerox Corporation, Stamford, Conn.

[21] Appl. No.: 09/145,950

[22] Filed: Sep. 3, 1998

[51] Int. Cl.[7] .................................................. G06F 15/00
[52] U.S. Cl. ........................................ 358/1.15; 358/1.13
[58] Field of Search .................................. 358/1.15, 1.14, 358/1.13, 1.18, 1.11, 1.9, 1.6, 1.1, 400, 401, 406, 407, 467, 468, 488, 487; 345/347, 338, 336, 352, 353, 333, 334, 349, 337; 399/8, 1, 2; 706/58, 11

[56] References Cited

U.S. PATENT DOCUMENTS

| | | | |
|---|---|---|---|
| 4,327,994 | 5/1982 | Barley et al. | 355/14 R |
| 4,393,375 | 7/1983 | Sugiura et al. | 340/700 |
| 4,572,656 | 2/1986 | Buchalter et al. | 355/24 |
| 5,045,880 | 9/1991 | Evanitsky et al. | 345/349 |
| 5,103,498 | 4/1992 | Lanier et al. | 706/58 |
| 5,363,204 | 11/1994 | Millman | 358/406 |
| 5,377,319 | 12/1994 | Kitahara et al. | 345/337 |
| 5,442,687 | 8/1995 | Miller | 358/400 |
| 5,524,085 | 6/1996 | Bellucco et al. | 364/514 C |
| 5,546,521 | 8/1996 | Martinez | 345/338 |
| 5,581,684 | 12/1996 | Dudzik et al. | 345/338 |
| 5,594,840 | 1/1997 | Sahay et al. | 358/1.14 |
| 5,608,860 | 3/1997 | Fitzpatrick et al. | 345/352 |
| 5,699,486 | 12/1997 | Tullis et al. | 395/2.79 |
| 5,706,411 | 1/1998 | McCormick et al. | 358/1.15 |
| 5,734,804 | 3/1998 | Bergner | 358/1.14 |
| 5,802,429 | 9/1998 | Yamashita | 399/8 |
| 5,825,355 | 10/1998 | Palmer et al. | 345/336 |

OTHER PUBLICATIONS

The Microsoft® Professional Tool Kit for Visual Basic™, pp. 1–32.

Article by Miller, "Program Control of Job Control Information Entry for Copier," IBM Technical Disclosure Bulletin, vol. 18, No. 10, Mar. 1976.

*Primary Examiner*—Dov Popovici
*Attorney, Agent, or Firm*—R. Hutter

[57] ABSTRACT

In a document processing system, whether a standalone copier, or network system including printers, scanners and facsimiles, a user is presented with a display in which numerous features, such as print or copy features, are offered. Each feature may include a plurality of selectable options, such as staple/no staple or simplex/duplex. If he selection of one option form a first feature precludes selection of another option of a second feature, such as for example precluding the placing of duplex images on a transparency, the precluded options in the second feature are indicated as unavailable, and a help button is displayed. When the help button is indicated by a cursor, the user sees only the specific information why the option in the second feature was precluded.

11 Claims, 3 Drawing Sheets

HELP BUTTON SERVICE FOR A USER INTERFACE IN A DIGITAL PRINTING SCANNING OR FACSIMILE SYSTEM

FIELD OF THE INVENTION

The present invention relates to user interfaces for document-processing devices, such as copiers, printers, scanners, etc., whether such devices are part of a stand alone machine (such as a copier) or disposed as a peripheral on a distributed network.

BACKGROUND OF THE INVENTION

The continued evolution of office document machines, such as copiers, printers, facsimile machines, and scanners, has resulted in highly sophisticated and function-rich machines. Typical selectable functions, such as on a copier, include making darker or lighter copies, selecting a number of copies, selecting from a number of alternate paper sizes, selecting stapled copies, copying on one or both sides of a paper sheet from one or both sides of an original, and image reduction or enlargement. Substantial efforts have been devoted to the design and layout of such machines to enhance an operator's understanding and reduce the possibility of operator entry errors. In a distributed, network oriented document management system, such as including one or redistributed printers, scanners, facsimile devices, and the like, such complicated functions may be selected via a "window" on a standard personal computer screen. Regardless of the particular interface used to control one or more document machines, there is still a premium to be placed on avoiding operator confusion.

Efforts to avoid operator confusion and error generally concentrate on presenting or displaying to the operator only those function choices which are relevant in a particular context. Thus, a typical design of a user interface for a copier, for instance, would typically include a number of backlit of LCD-based features to be displayed; in general, by selectably lighting only the features desired to be selected from at a given time, a human user can be guided though a complicated selection process. When features are not available, such as stapling, a display for stapling is not lit. If selection of one feature is precluded by a previous selection of another feature, the precluded feature is not lit: for example, if a user selects the copies to be printed on transparencies, it would be desirable not to display a duplex option once transparencies are selected.

As office equipment becomes more and more a matter of interaction between networked peripherals, it is more common to have the users make their selections via a personal computer. It is common in personal computers, particularly with a graphical user interface such as known in the Apple® Macintosh® or Microsoft® Windows™ interfaces, to provide a "help" button somewhere on the screen at all times. The purpose of the help button is to enable the user to understand the function of a particular graphical icon. One well-known problem with "help buttons" in practice is that there is difficulty in allowing the user to isolate the precisely relevant portion of help information that is needed at a particular time. Very often, the text in a help file is written at such a general level as to be useless. When using any kind of help feature, it is most desirable to be able to provide only the most relevant help information given a particular situation, and to make this help information readily available when the information is likely to be needed.

DESCRIPTION OF THE PRIOR ART

In the prior art, the article by Miller, "Program Control of Job Control Information Entry for Copier," IBM Technical Disclosure Bulletin, Volume 18, No. 10, March 1976, discloses an early system for guiding an operator through the use of a relatively complicated copying machine. Basically, the user is guided through a series of selections by displaying the the user only one selection to be made at a time.

U.S. Pat. Nos. 4,327,994; 4,393,375; and 4,572,656 represent early attempts to provide users of a complicated copier with a logical series of displays which would minimize operator confusion in making selections from various copy features.

U.S. Pat. No. 5,524,085 discloses a system by which a user placing a print job on a network can provide certain information, such as to a human user elsewhere on the network, relevant to the print job in multimedia form, particularly as an audio message. When the print job is about to be printed, the voice message is played to he human user, such as the printing apparatus.

U.S. Pat. No. 5,699,486 discloses a hypertext-based user interface which can be used, for example, with office equipment such as printers and copiers. In order to minimize clutter on a user interface screen, certain help files are presented to the user as audio signals.

The Microsoft® Professional Tool Kit for Visual Basic™, represents a typical prior-art system for providing help messages from a help file, generally in the art of commercial computer software. As described at pages3–4 of the Tool Kit manual, individual help files appear to a user in a help window that appears when the user asks for help with a "CallHelp" command. Once in the CallHelp window, there may be hypertext links on individual works or icons, which are called "jumps." When the user clicks a jump for a related topic (denoted by underlined text), the help window switches to a screen displaying different information such as a description of the new topic. At pages 10–11 of the Tool Kit manual, there is a description of the concept of "Context-Sensitive Help Topics." As stated in the manual, "context-sensitive Help enables the user to press SHIFT+F1, then open a menu and chose an item to get help with the selected menu item. ***To plan for context sensitive Help, the Help writer and the application programmer should agree on a list of context numbers. Context numbers are unique numbers that correspond to each menu command, control, or screen region in the application . . . they are used to create the links between the application and the corresponding help topics."

SUMMARY OF THE INVENTION

According to one aspect of the present invention, there is provided a method of operating a printing apparatus in which images derived are rendered on sheets. A first feature and a second feature are displayed, each of the first feature and the second feature offering a user to select one of a plurality of options, each option being an instruction for operation of the printing apparatus. If selecting a first option from the first feature requires at least one option of the second feature to become unavailable, a help display is displayed in response to selecting the first option from the first feature. The help display results in a display to the user which explains why an option of the second feature is unavailable.

According to another aspect of the present invention, there is provided a method of operating a system which is capable of performing at least two functions from a group of functions including printing images derived from digital data on sheets, scanning hard-copy data into an electronic memory, and sending a facsimile message. A first feature and a second feature is displayed, each of the first feature and the second feature offering a user to select one of a plurality of options, each option being an instruction for operation of the system. If selecting a first option from the first feature requires at least one option of the second feature to become unavailable, a help display is displayed in response to selecting the first option from the first feature. The help display results in a display to a user which explains why an option of the second feature is unavailable.

With regard to certain of the claims, it will be understood that a "printing apparatus" is a term which can include a digital or light-lens copier, and an include a plurality of isolated elements, such as a scanner and a digital printer, which are interconnected over a network.

DETAILED DESCRIPTION OF THE INVENTION

Figure 1:
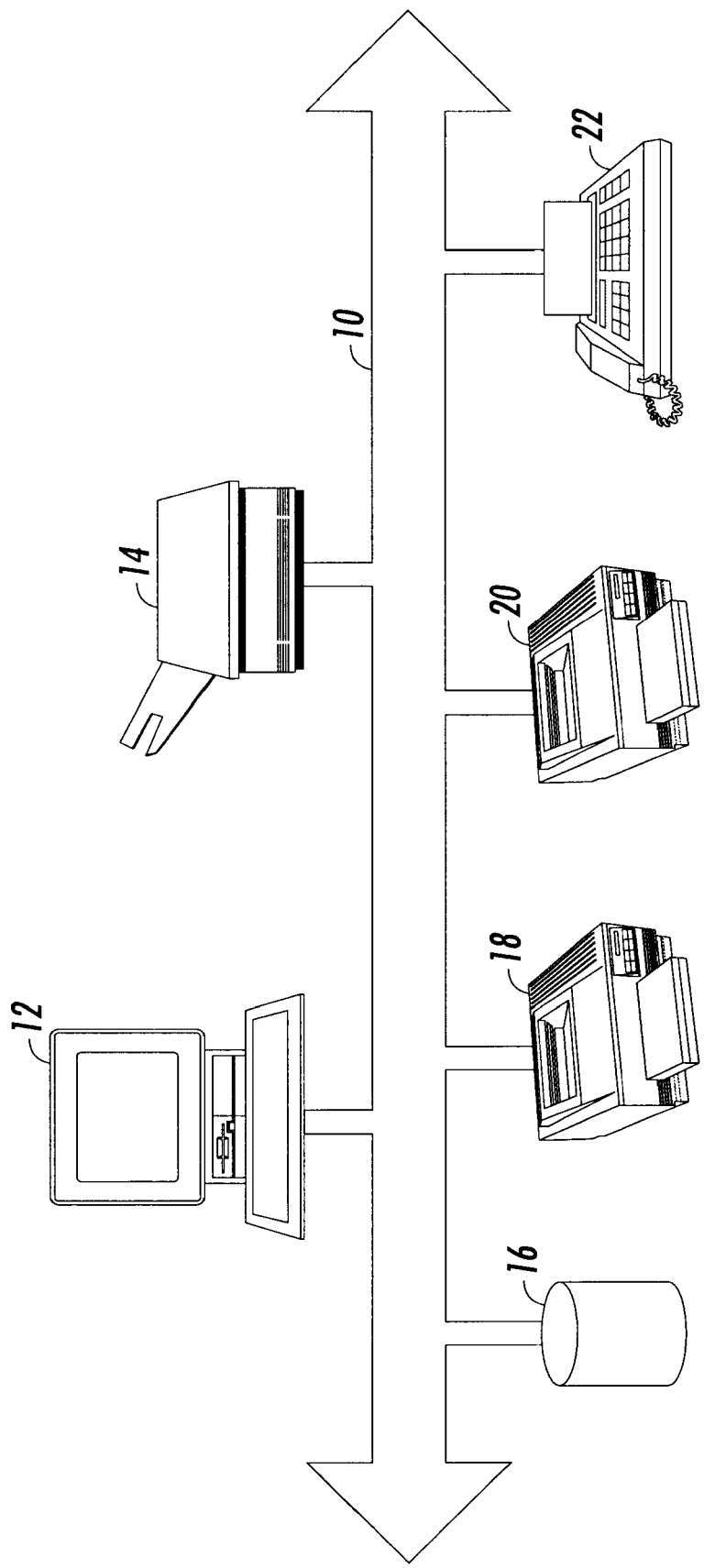
FIG. 1 is simplified diagram showing a networked document services system in which the present invention is useful.

FIG. 1 is a simplified diagram showing an example of a networked document-services system in which the present invention is useful. A network bus 10, which may be of any type known in the art, such as Ethernet or Token-Ring, interconnects a number of computers and peripherals. For example, on network 10 there would be typically any number of personal computers such as 12, scanners such as 14, shared memories such as 16, and of course printers such as 18 and 20. The network 10 may further interconnect a fax machine 22, which in turn connects with a standard telephone network. What is important is that the various computers and peripherals can interact to perform various document services. For example, if a hard-copy document is scanned through scanner 14 and then printed out on a printer such as 18 in response to commands from computer 12, in effect the network is creating a digital copier. While a distributed network of peripherals and computers is shown, it will be understood that the claimed method below can be applied to, for example, a standalone digital copier or facsimile as well.

Figure 2:
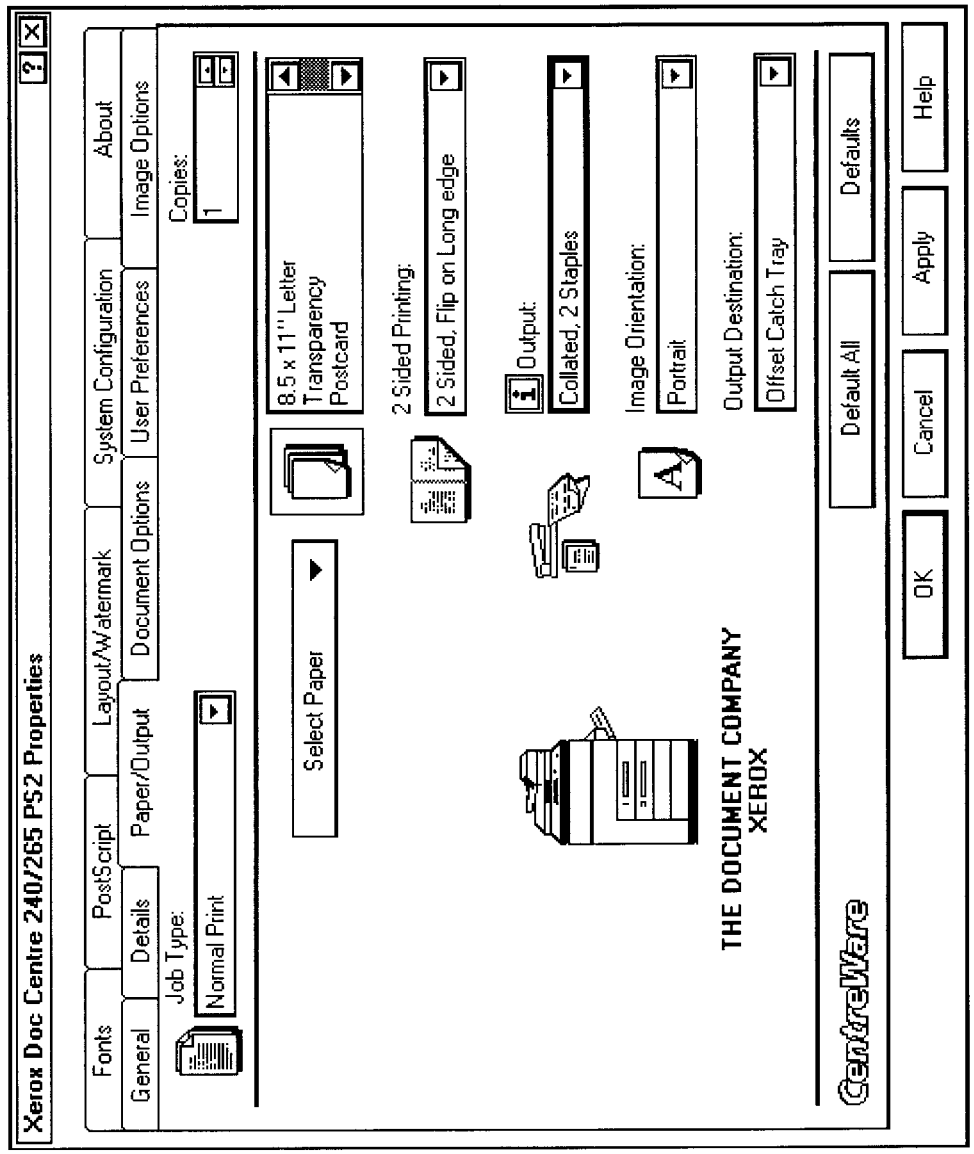
FIG. 2 is an example of a window in a graphical user interface in which the present invention is useful.

The computer such as 12 includes a screen on which a graphical user interface (GUI) can be displayed. FIG. 2 is an example of a window associated with a graphical user interface that would be used in a networked document services environment; of course, an equivalent of the GUI shown in FIG. 2 could be displayed directly on, for example, a digital copier. In he GUI of FIG. 2, a various set of features, of which the printer or copier being controlled is capable, is displayed to the user. In this particular embodiment, each feature is displayed in the form of a pull-down menu, and pulling down any pull-down menu will cause to be displayed to the user a list of options associated with that feature. For example, if the feature in question is "stapling," a pull-down menu would typically display the following selectable options: no staple (typically the default choice), long edge staple, short edge staple, booklet staple, etc. For purposes of the claims, what is important is that the general "feature" is displayed at a given time, whether or not all of the individual options within the feature can be displayed at a particular time.

Particularly in regard to use of a printer, either as a network printer or as part of a digital copier, certain combinations of selectable options will be physically impossible or generally inadvisable. For instance, if the prints are selected to be output on transparencies, it is unlikely that the user would desire a duplex image on the transparency, as this would produce a useless transparency. Similarly, it is unlikely that the user would want to staple transparencies together. Also, if very small or very large size paper is selected, such as postcards or poster stock, it may be physically impossible for the particular printer to create a duplex image thereon. Thus, to pursue this example, if a user selects "transparency" from the select paper list, according to the invention, the list of possible selections under the "output" window would have to be restricted, as will the two-sided printing selections. In brief, if "transparency" is selected, no two-sided printing will be allowed, nor will the transparencies be permitted to be stapled.

In terms of the graphical user interface, these now unavailable options, such as two-sided printing and stapling, are preferably still generally displayed to the user when the pull-down menu is displayed for that feature, but the unavailable options will be shown in a "grayed out" form, indicating that under these particular circumstances, the particular option is unavailable. Thus, in this example, if a transparency is selected, under the "two-sided printing" pull-down menu, the selection "one-sided printing" will be displayed normally, while displays such as "tow-sided, flip on long edge" and "tow-sided flip on short edge" will be generally shown in grayed out form, indicating that these options are currently unavailable. The general idea of showing currently-unavailable options in grayed out form is known in the art, such as in the Macintosh® or Windows™ graphical user interfaces.

A novelty of the present invention is that there is displayed, next to the title display for each feature such as two-sided printing, stapling, output, orientation, etc., a special help button, indicated in the Figure with an i, that will explain why certain of the selectable options underneath the feature are no longer selectable. Significantly, the help button i appears only as a result of situations where the usual number of options is decreased for a feature as a result of selection of one option in another feature. For instance, selecting transparency or postcard under "select paper" will case a restriction in the options under two-sided printing or output. If, under "select paper," letter or legal were selected (options which would not conflict with or otherwise constrain the stapling or duplex options), no help button would be shown next to the two-sided printing or output titles. By displaying a help button only when there is something to explain, the present invention avoids displaying to a user unnecessarily generalized help information.

Figure 3:
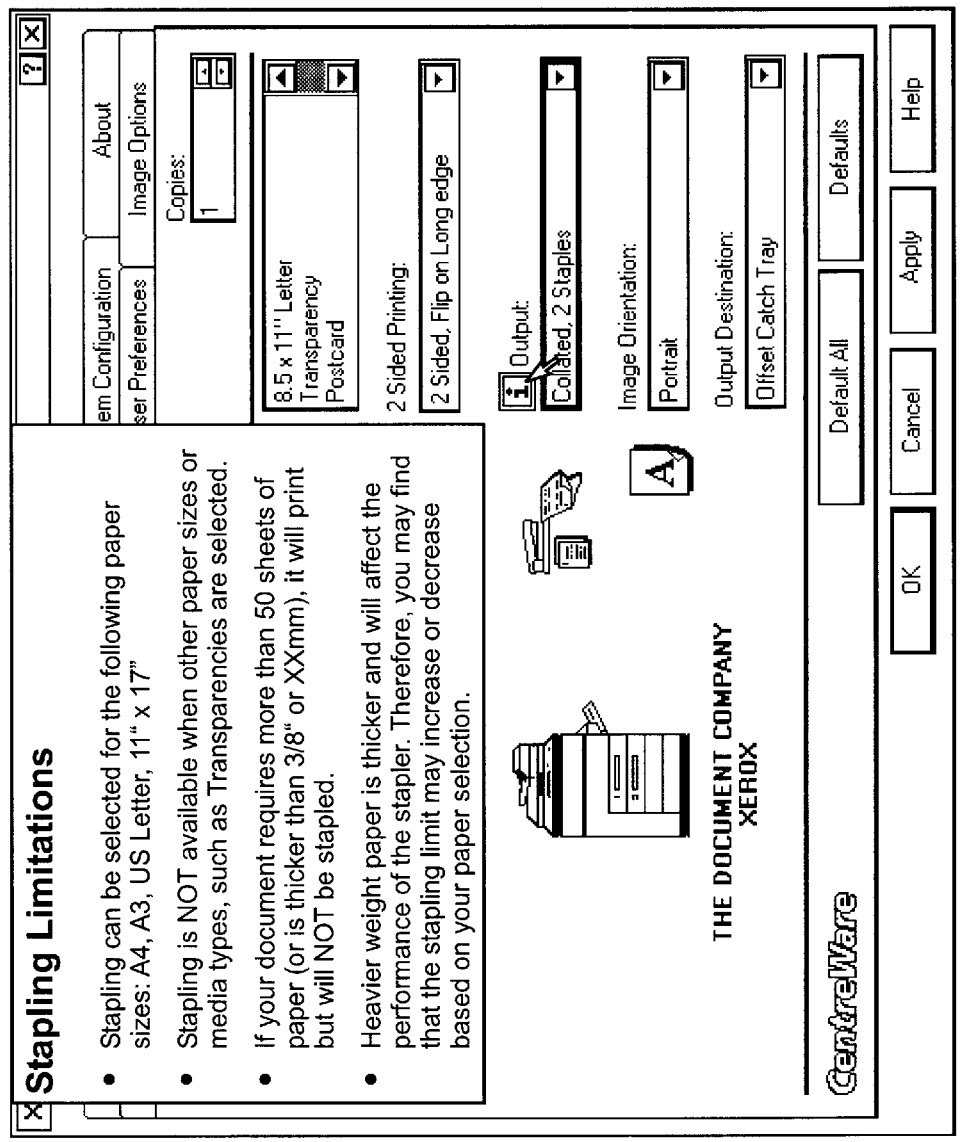
FIG. 3 is a rendering of the window of FIG. 2, showing a help pop-up window displayed according to the present invention.

FIG. 3 is another example of a screen in which the information help button i next to the output title has been pushed by the user, such as through a mouse click. A pop-up-window appears next to the cursor, which explains specifically why certain options under a particular feature are no longer available. It is significant that the help text in the pop-up window is relevant strictly to the question of whether certain options in "output" are now unavailable. In this way, the present invention is superior to generalized "help" buttons known in the art, because such generalized help buttons typically require the user to scroll through an index of information to find particularly relevant information. According to a preferred embodiment of the present invention, the pop-up display should be uniquely associated with the occurrence of any particular help button i, so that the pop-up will include only that information which is immediately relevant to why the particular help button i appeared in the first place.

With regard to FIG. 3, it will be seen that all of the information in the example pop-up window is relevant only to factors which cause the stapling options to be reduced from a usual set. Once again, if in a particular instance a transparency (or other constraining selection) is not made, the help button i itself will not be displayed.

The display which explains why an option of the second feature is unavailable should appear simply when the help button is indicated by a cursor, such as through a mouse or touch screen. It is a matter of design choice whether any mouse-clicks or equivalent actions should be required relative to the help button to bring out the pop-up display.

A preferred option for a user interface according to the present invention is to have the individual help button i be dimmed, grayed, or otherwise altered after it has been selected by the user. In this way, particularly if a number of help buttons i are displayed at once, the user can determine which buttons he has already clicked. Preferably, once the window is closed, all of the help buttons are refreshed and returned to their original state.

Returning to FIG. 1, the system of the present invention can be provided in any document-processing system, even one in which various individual hardware elements, such as a scanner 14, printer 18, or facsimile 22, are connected through a network 10. The basic principle of the present invention, as described above in the context of remote printing or copying, can be applied to a scanning or facsimile context.

As an example of an application of the present invention in network scanning, it is typical in scanning software to provide a program which "watches" a folder on a server for any new scans (such as coming in through scanner 14) to process the scan, such as with OCR software. However, it is typical in network scanning arrangements that only one agent (such as computer 12) may watch a folder at one time because any subsequent processing to the scanned-in data file may alter or delete the file; this alteration may cause errors for other agents attempting to process the same file. In this context, a help button i could be displayed to notify the user, such as on computer 12, of this constraint that may have disabled the selection of certain folders for watching.

In a network facsimile context, it is a common feature of facsimile machines such as 22 to allow a user (who may be accessing the facsimile 22 though computer 12) to broadcast-fax a document to several different recipients simultaneously. FCC regulations prescribe a limit to the number of recipients to which a broadcast fax can be directed at one time. Thus, if in a window where a user may simply select with mouse clicks any number of recipients for broadcast faxing, the selection of too many recipients could cause some other button in the display, such as an "OK" button which would start the facsimile process, to become disabled (i.e., grayed out) and then cause a help button to be displayed next to the grayed-out button. When the help button next to the grayed-out OK button is clicked or otherwise indicated by the user, the resulting help display would specifically inform the user that he has exceeded the legal limit for number of recipients in a broadcast fax.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A method of operating a printing apparatus in which images are rendered on sheets, comprising the steps of:
   displaying a first feature and a second feature, each of the first feature and the second feature offering a user to select one of a plurality of options, each option being an instruction for operation of the printing apparatus;
   if selecting a first option from the first feature requires at least one option of the second feature to become unavailable, displaying a help display in response to selecting the first option from the first feature; and
   the help display resulting in a display to a user which explains why an option of the second feature is unavailable.

2. The method of claim 1, the help display including a help button visually associated with the second feature.

3. The method of claim 2, the help button linking to the display which explains why the option of the second feature is unavailable.

4. The method of claim 2, the help button becoming altered in appearance after the display which explains why the option of the second feature is unavailable is displayed.

5. The method of claim 1, the display which explains why the option of the second feature is unavailable being uniquely associated with the first option from the first feature.

6. The method of claim 1, the step of the help display resulting in a display to a user which explains why an option of the second feature is unavailable including the display resulting when the help display is indicated with a cursor.

7. A method of operating a system which is capable of performing at least two functions form a group of functions including printing images derived from digital data on sheets, scanning hard-copy data into an electronic memory, and sending a facsimile message, comprising the steps of:
   displaying a first feature and a second feature, each of the first feature and the second feature offering a user to select one of a plurality of options, each option being an instruction for operation of the system;
   if selecting a first option from the first feature requires at least one option of the second feature to become unavailable, displaying a help display in response to selecting the first option from the first feature; and
   the help display resulting in a display to a user which explains why an option of the second feature is unavailable.

8. The method of claim 7, the help display including a help button visually associated with the second feature.

9. The method of claim 8, the help button becoming altered in appearance after the display which explains why he option of the second feature is unavailable is displayed.

10. The method of claim 7, the display which explains why the option of the second feature is unavailable being uniquely associated with the first option from the first feature.

11. The method of claim 7, the step of the help display resulting in a display to a user which explains why an option of the second feature is unavailable including the display resulting when the help display as indicated with a cursor.

* * * * *